US012102572B2

(12) United States Patent
Holtson

(10) Patent No.: US 12,102,572 B2
(45) Date of Patent: Oct. 1, 2024

(54) MORTUARY UNDERGARMENT ASSEMBLY

(71) Applicant: Brittany T. Holtson, Torrance, CA (US)

(72) Inventor: Brittany T. Holtson, Torrance, CA (US)

( * ) Notice: Subject to any disclaimer, the term of this patent is extended or adjusted under 35 U.S.C. 154(b) by 91 days.

(21) Appl. No.: 18/077,383

(22) Filed: Dec. 8, 2022

(65) Prior Publication Data

US 2024/0189171 A1 Jun. 13, 2024

(51) Int. Cl.
*A61G 17/06* (2006.01)

(52) U.S. Cl.
CPC .................................... *A61G 17/06* (2013.01)

(58) Field of Classification Search
CPC .... A61G 17/06; A61G 17/00; A61G 17/0136; A61G 17/007; A41B 9/00; A41B 13/005; A41D 13/1272; A41D 11/00; A41D 2200/20
See application file for complete search history.

(56) References Cited

U.S. PATENT DOCUMENTS 1,125,467 A 1/1915 Cannon
2,621,336 A 12/1952 Wendroff
2,709,667 A * 5/1955 Grubb .................. A62B 17/001 2/5
3,100,897 A 8/1963 Langer
4,031,565 A 6/1977 Coates
4,831,664 A * 5/1989 Suda .................... A62B 17/006 2/457
5,023,952 A * 6/1991 Palmer ................. A41B 13/005 2/69
5,918,314 A * 7/1999 Moses .................... A41D 13/02 2/84
6,604,248 B1 * 8/2003 Brown ................... A41D 13/02 2/84
D708,423 S 7/2014 Adams
8,943,613 B2 2/2015 Novak
11,376,181 B2 * 7/2022 Gresham ................ A61G 17/06
11,963,560 B2 * 4/2024 Lo ....................... A41D 13/1218
2007/0283480 A1 * 12/2007 Harris .................. A41B 13/005 224/160
2010/0138972 A1 * 6/2010 Novak ............... A61G 17/0136 2/243.1
2011/0179547 A1 * 7/2011 Stoneham ............ A41B 13/005 2/83
2013/0007940 A1 * 1/2013 Ryerson ................. A41D 11/00 2/80

(Continued)

FOREIGN PATENT DOCUMENTS

FR 2897516 A1 * 8/2007 ......... A41D 13/0005
GB 2424354 9/2006

*Primary Examiner* — William L Miller

(57) ABSTRACT

A mortuary undergarment assembly for dressing a deceased infant such that embalming fluid is contained includes a coverall body being liquid impermeable, being flexible, and having a shape for receiving a deceased infant into the coverall body. A hood body is liquid impermeable, flexible, and configured for partially covering a head section of the deceased infant to expose a face section of the deceased infant. The hood body is engaged to the coverall body such that liquid is deterred from permeating between the hood body and the coverall body. A method of dressing the deceased infant with the coverall body and the hood body is also disclosed.

12 Claims, 5 Drawing Sheets

(56) References Cited

U.S. PATENT DOCUMENTS

| | | | | |
|---|---|---|---|---|
| 2016/0255886 | A1* | 9/2016 | Arzu | A41B 13/00 |
| 2016/0278465 | A1* | 9/2016 | Rolfe | A42B 1/048 |
| 2017/0055612 | A1* | 3/2017 | Francis, II | A41F 1/002 |
| 2017/0325514 | A1* | 11/2017 | Kravchenko-Berezhnaya | A41B 13/005 |
| 2018/0042310 | A1* | 2/2018 | Mortimer | A41B 13/005 |
| 2018/0271196 | A1* | 9/2018 | Hussey | A41D 13/1153 |
| 2019/0075854 | A1* | 3/2019 | Kravchenko-Berezhnaya | A41B 13/005 |
| 2020/0383404 | A1* | 12/2020 | Naismith | A41D 13/1263 |
| 2021/0128386 | A1* | 5/2021 | Gresham | A61G 17/06 |
| 2022/0323284 | A1* | 10/2022 | Gresham | A61G 17/06 |

* cited by examiner

MORTUARY UNDERGARMENT ASSEMBLY

BACKGROUND OF THE INVENTION

(1) Field of the Invention

The disclosure relates to mortuary undergarments and more particularly pertains to a new mortuary undergarment for dressing a deceased infant such that embalming and other fluids are contained.

(2) Description of Related Art Including Information Disclosed Under 37 CFR 1.97 and 1.98

The prior art relates to mortuary undergarments including garments with closed foot portions and a pouch for containing a fetus predeceasing normal birth.

BRIEF SUMMARY OF THE INVENTION

An embodiment of the disclosure meets the needs presented above by generally comprising a coverall body being liquid impermeable, being flexible, and having a shape for receiving a deceased infant into the coverall body. A hood body is liquid impermeable, flexible, and configured for partially covering a head section of the deceased infant to expose a face section of the deceased infant. The hood body is engaged to the coverall body such that liquid is deterred from permeating between the hood body and the coverall body.

Another embodiment of the disclosure includes a method comprising a step of positioning the deceased infant into a coverall body such that a torso section of the deceased infant is positioned within a torso portion of the coverall body, each of a pair of arm sections of the deceased infant are positioned within one of a pair of arm portions of the coverall body, each of a pair of leg sections of the deceased infant are positioned within one of a pair of leg portions of the coverall body, and a neck section of the deceased infant extends through a neck opening of the torso portion. Each of the pair of arm portions is integrally coupled to and extend laterally from the torso portion, and each of the pair of leg portions is integrally coupled to and extends downwardly from the torso portion. The neck opening extends through a top side of the torso portion. A fastener may also be fastened such that a slit of the torso portion is closed. The torso portion has a neck collar that is coextensive with the neck opening, and the slit extends through and downwardly from the neck collar. The fastener is attached to the coverall on each of a pair of opposing edges of the coverall adjacent to the slit.

Another step includes partially covering a head section of the deceased infant with a hood body such that a face section of the deceased infant is exposed through a face opening of the hood body. The face opening extends through a front side of the hood body. A shoulder portion of the hood body may be positioned such that it extends through the neck opening and abuts an inner surface of the torso portion. The shoulder portion is coupled to a bottom of the head portion and extends outwardly and downwardly from the head portion. A face rim of the hood body may be adhered to the head section of the deceased infant, the face rim is coextensive with the face opening.

The hood body is urged to engage the coverall body such that liquid is deterred from permeating between the hood body and the coverall body. To urge the hood body to engage the coverall body, a drawstring may be urged cinch the neck opening. The drawstring extends through a neck collar is coextensive with the neck opening.

The deceased infant is dressed in clothes such that the clothes are positioned over the coverall and the hood body. A bonnet may be positioned over the hood body for this step.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
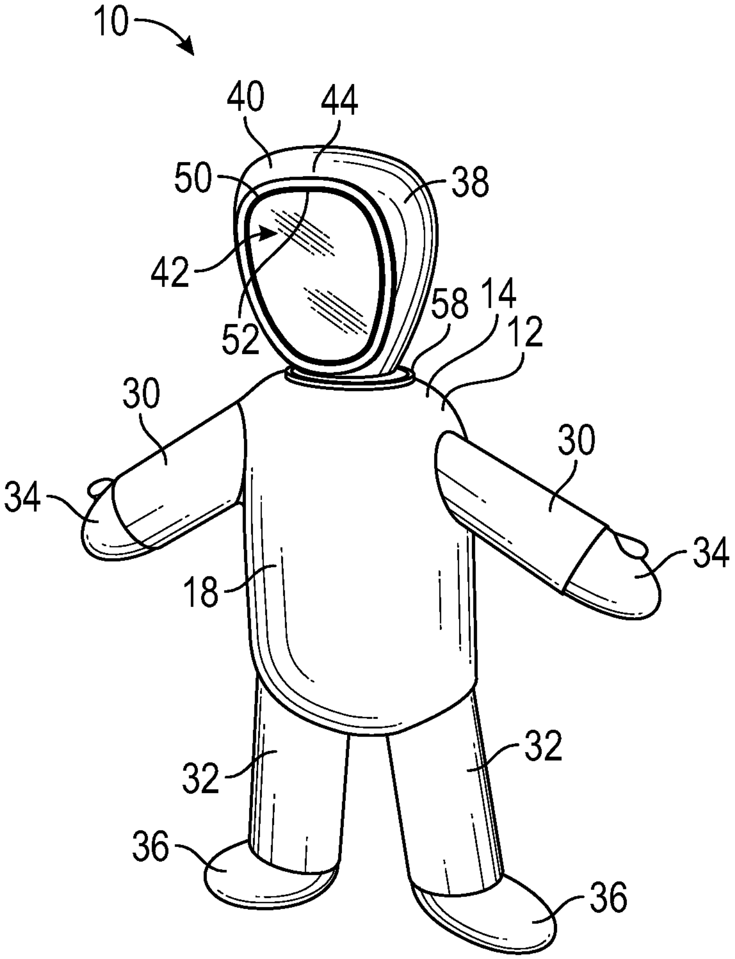
FIG. 1 is a perspective view of a mortuary undergarment assembly according to an embodiment of the disclosure.
Figure 2:
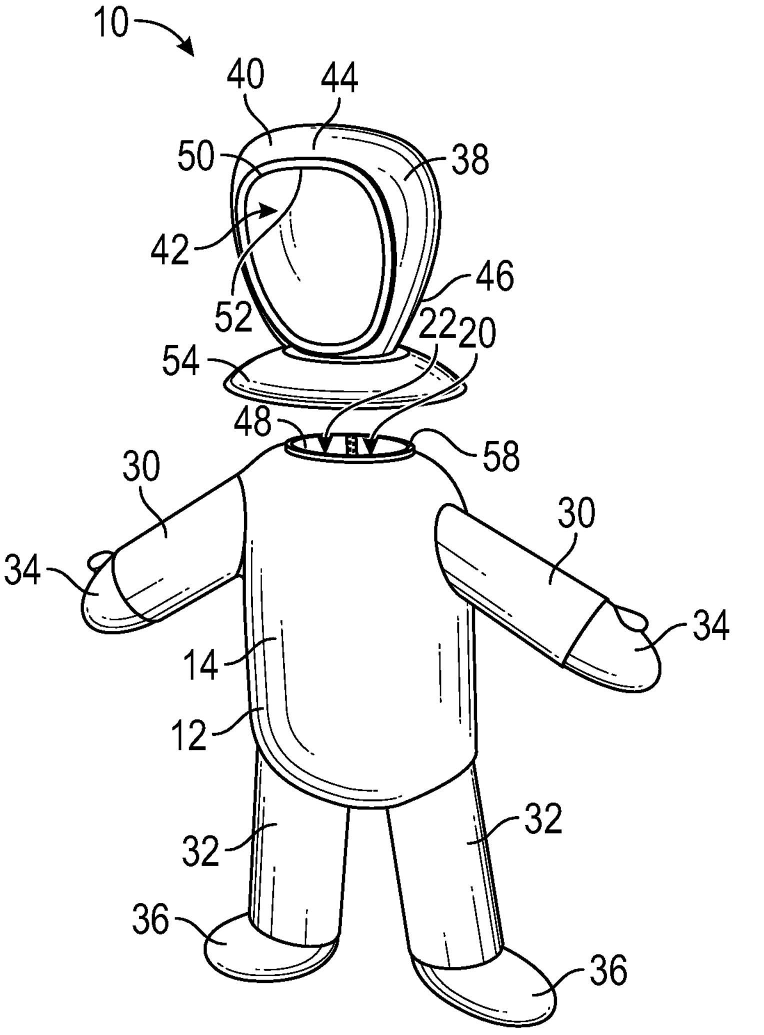
FIG. 2 is an exploded perspective view of an embodiment of the disclosure.
Figure 3:
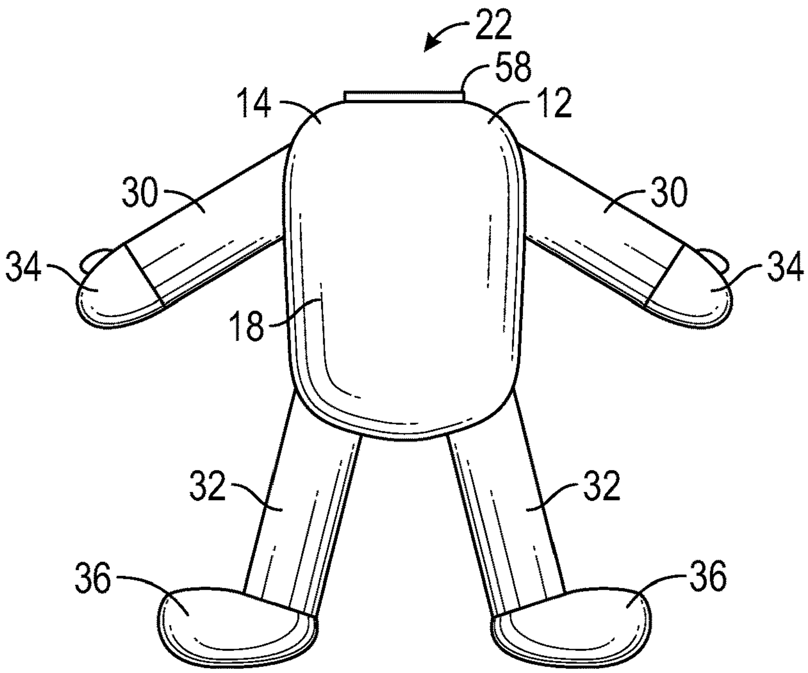
FIG. 3 is a front view of a coverall body of an embodiment of the disclosure.
Figure 4:
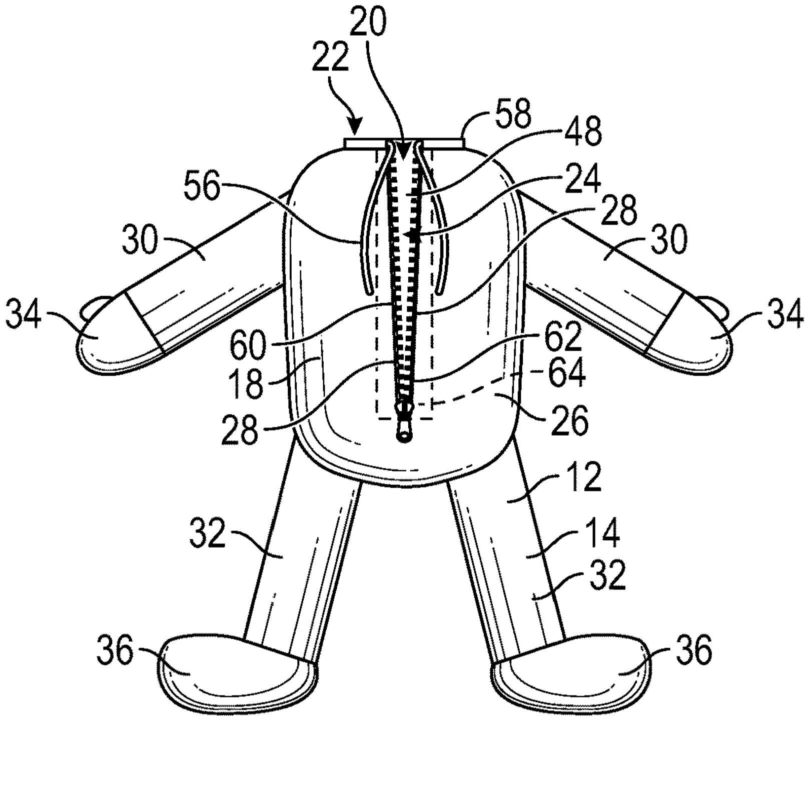
FIG. 4 is a back view of a coverall body of an embodiment of the disclosure.
Figure 5:
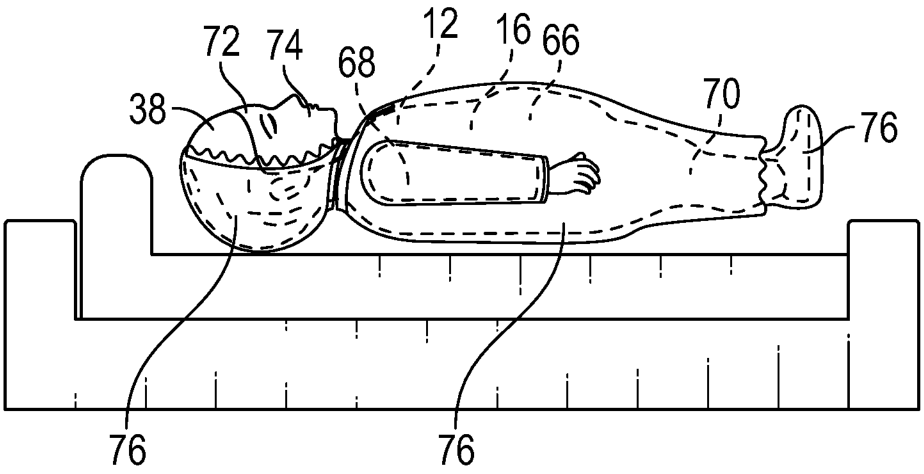
FIG. 5 is an in-use side view of an embodiment of the disclosure.
Figure 6:
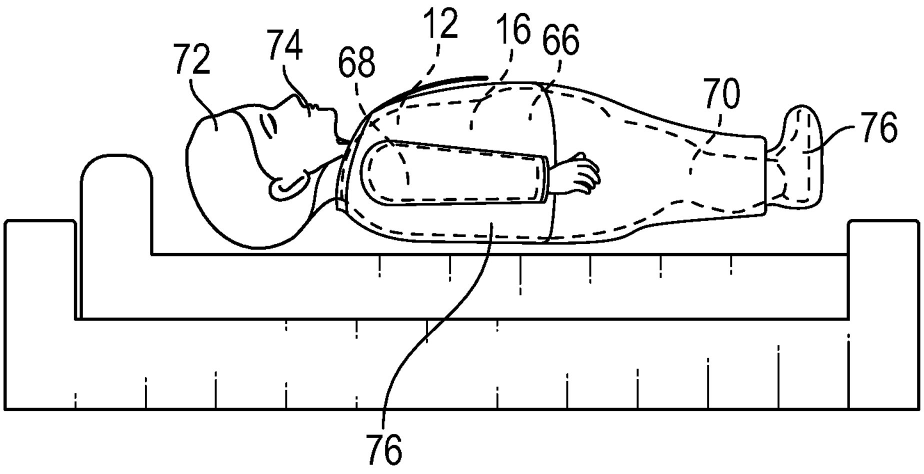
FIG. 6 is an in-use side view of an embodiment of the disclosure.

With reference now to the drawings, and in particular to FIGS. 1 through 6 thereof, a new mortuary undergarment embodying the principles and concepts of an embodiment of the disclosure and generally designated by the reference numeral 10 will be described.

As best illustrated in FIGS. 1 through 6, the mortuary undergarment assembly 10 generally comprises a coverall body 12 being liquid impermeable, being flexible, and having a shape 14 for receiving a deceased infant 16 into the coverall body 12. The coverall body 12 comprises a torso portion 18 including a torso chamber 20 being positioned therein for containing a torso section 66 of the deceased infant 16. The torso portion 18 includes a neck opening 22 extending through a top side of the torso portion 18 into the torso chamber 20. A neck collar 58 is coextensive with the neck opening 22, and a slit 24 extends through and downwardly from the neck collar 58. The slit 24 is positioned on a back side 26 of the torso portion 18, and the torso portion 18 has a pair of opposing edges 28 positioned adjacent to the slit 24. The coverall body 12 also comprises a pair of arm portions 30 and a pair of leg portions 32. Each of the pair of arm portions 30 is integrally coupled to and extends laterally from the torso portion 18. And each of the pair of leg portions 32 is integrally coupled to and extends downwardly from the torso portion 18. Each of the pair of arm portions 30 may terminate with a closed hand covering 34, and each of the pair of leg portions 32 may terminate with a closed foot covering 36. If the arm portions 30 and leg portions 32 have open ends, they may include adhesives, elastic bands, or other like connectors for attaching the coverall body 12 to the body of the deceased infant 16 to prevent leakages.

A hood body 38 is liquid impermeable, flexible, and configured for partially covering a head section 72 of the deceased infant 16 such that a face section 74 of the deceased infant 16 is exposed. The hood body 38 is engaged to the coverall body 12 such that liquid is deterred from permeating between the hood body 38 and the coverall body 12. The hood body 38 comprises a head portion 40 with a face opening 42 extending through a front side 44 of the head portion 40. A shoulder portion 54 is coupled to a bottom 46 of the head portion 40. The shoulder portion 54 extends outwardly and downwardly from the head portion 40. The shoulder portion 54 extends through the neck opening 22 and is positioned in abutment with an inner surface 48 of the torso portion 18. A face rim 50 is coextensive with the face opening 42, and an adhesive strip 52 is coupled to and extends along the face rim 50. The adhesive strip 52 is configured to attach to the head section 72 of the deceased infant 16.

A drawstring 56 extends through the neck collar 58 for cinching the neck opening 22 against the hood body 38 to deter fluid flow between the hood body 38 and the torso portion 18. Alternatively, an elastic band, adhesive, or other attachment may be incorporated for engaging the hood body 38 to the coverall body 12. A fastener 60 for closing the slit 24 of the torso portion 18 is attached to the coverall body 12 on each of the pair of opposing edges 28 of the coverall adjacent to the slit 24. The fastener 60 comprises a zipper 62 extending along both of the pair of opposing edges 28 of the torso portion 18, but the fastener 60 may comprise a lacing arrangement, adhesive, hook-and-loop connector, or the like. A sealing flap 64 is coupled to the inner surface 48 of the torso portion 18 adjacent to the fastener 60 and covers the fastener 60 such that liquid cannot permeate through the fastener 60.

In use, the torso section 66 of the deceased infant 16 is positioned into the torso portion 18 of the coverall body 12, a pair of arm sections 68 of the deceased infant 16 are positioned into one of the pair of arm portions 30, and a pair of leg sections 70 of the deceased infant 16 are positioned into one of the pair of leg portions 32. The hood body 38 is positioned to cover the head section 72 of the deceased infant 16 such that the face section 74 is exposed through the face opening 42. The shoulder portion 54 of the hood body 38 is positioned to extend through the neck opening 22 of the coverall body 12 and abut the inner surface 48 of the torso portion 18. The drawstring 56 is cinched to engage the hood body 38 to the coverall body 12, and the zipper 62 is closed. Then the deceased infant 16 may be continued to be dressed in conventional infant and toddler clothes 76 that are placed around the coverall body 12 and the hood body 38. The clothes 76 may further include a bonnet 78 placed over the hood body 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mortuary undergarment assembly for children a deceased infant comprising:

a coverall body being liquid impermeable and having a shape for receiving the deceased infant therein, the coverall body being flexible;

a hood body being liquid impermeable and being flexible, the hood body being configured for partially covering a head section of the deceased infant to expose a face section thereof, the hood body being engaged to the coverall body such that liquid is deterred from permeating between the hood body and the coverall body; a torso portion including a torso chamber being positioned therein for containing a torso section of the deceased infant, the torso portion including a neck opening extending through a top side of the torso portion into the torso chamber, the torso portion having a neck collar being coextensive with the neck opening;

a head portion including a face opening extending through a front side of the head portion, a face rim being coextensive with the face opening; and a shoulder portion being coupled to a bottom of the head portion, the shoulder portion extending outwardly and downwardly from the head portion, the shoulder portion extending through the neck opening and being positioned in abutment with an inner surface of the torso portion; and a drawstring extending through the neck collar for cinching the neck opening against the hood body to deter fluid flow between the hood body and the torso portion.

2. The assembly of claim 1, wherein the coverall body comprises;

a pair of arm portions each being integrally coupled to and extending laterally from the torso portion; and a pair of leg portions each being integrally coupled to and extending downwardly from the torso portion.

3. The assembly of claim 2, wherein each of the arm portions terminates with a closed hand covering.

4. The assembly of claim 2, wherein each of the leg portions terminates with a closed foot covering.

5. The assembly of claim 1, wherein the hood body further comprises an adhesive strip being coupled to and extending along the face rim, the adhesive strip being configured to attach to the head section of the deceased infant.

6. A assembly of claim 1, further comprising:

the coverall body comprising:

the torso portion having a slit extending through the neck collar, the slit being positioned on a back side of the torso portion and extending downwardly from the neck collar, the torso portion having a pair of opposing edges positioned adjacent to the slit;

a pair of arm portions each being integrally coupled to and extending laterally from the torso portion, each of the arm portions terminating with a closed hand covering; and a pair of leg portions each being integrally coupled to and extending downwardly from the torso portion, each of the leg portions terminating with a closed foot covering;

the hood body comprising an adhesive strip being coupled to and extending along the face rim, the adhesive strip being configured to attach to the head section of the deceased infant;

a fastener for closing the slit of the torso portion being attached to the coverall body on each of the pair of opposing edges of the coverall body adjacent to the slit, the fastener comprising a zipper extending along both of the pair of opposing edges of the torso portion; and a sealing flap covering the fastener such that liquid cannot permeate through the fastener, the sealing flap being coupled to the inner surface of the torso portion adjacent to the fastener.

7. A mortuary undergarment assembly for a deceased infant comprising:

a coverall body being liquid impermeable and having a shape for receiving the deceased infant therein, the coverall body being flexible;

a hood body being liquid impermeable and being flexible, the hood body being configured for partially covering a head section of the deceased infant to expose a face section thereof, the hood body being engaged to the coverall body such that liquid is deterred from permeating between the hood body and the coverall body;

wherein the coverall body comprises:

a torso portion including a torso chamber being positioned therein for containing a torso section of the deceased infant, the torso portion including a neck opening extending through a top side of the torso portion into the torso chamber, the torso portion having a neck collar being coextensive with the neck opening, a pair of arm portions each being integrally coupled to and extending laterally from the torso portion, a pair of leg portions each being integrally coupled to and extending downwardly from the torso portion, wherein the torso portion has a slit extending through the neck collar, the slit being positioned on a back side of the torso portion and extending downwardly from the neck collar, the torso portion having a pair of opposing edges positioned adjacent to the slit;

a fastener for closing the slit of the torso portion being attached to the coverall body on each of the pair of opposing edges of the coverall body adjacent to the slit; and a sealing flap covering the fastener such that liquid cannot permeate through the fastener, the sealing flap being coupled to the inner surface of the torso portion adjacent to the fastener.

8. The assembly of claim 7, wherein the fastener comprises a zipper extending along both of the pair of opposing edges of the torso portion.

9. A method of dressing a deceased infant to prevent leakage of embalming fluid comprising the steps of:

positioning the deceased infant into a coverall body such that a torso section of the deceased infant is positioned within a torso portion of the coverall body, each of a pair of arm sections of the deceased infant are positioned within one of a pair of arm portions of the coverall body, each of a pair of leg sections of the deceased infant are positioned within one of a pair of leg portions of the coverall body, and a neck section of the deceased infant extends through a neck opening of the torso portion, wherein each of the pair of arm portions is integrally coupled to and extend laterally from the torso portion, wherein each of the pair of leg portions is integrally coupled to and extends downwardly from the torso portion, wherein the neck opening extends through a top side of the torso portion;

partially covering a head section of the deceased infant with a hood body such that a face section of the deceased infant is exposed through a face opening of the hood body, wherein the face opening extends through a front side of the hood body;

urging the hood body to engage the coverall body such that liquid is deterred from permeating between the hood body and the coverall body;

dressing the deceased infant in clothes such that the clothes are positioned over the coverall body and the hood body;

positioning a shoulder portion of the hood body such that it extends through the neck opening and abuts an inner surface of the torso portion, wherein the shoulder portion is coupled to a bottom of the head portion, wherein the shoulder portion extends outwardly and downwardly from the head portion; and wherein the step of engaging the hood body to the coverall body further comprises urging a drawstring to cinch the neck opening, the drawstring extending through a neck collar being coextensive with the neck opening.

10. The method of claim 9, further comprising a step of fastening a fastener such that a slit of the torso portion is closed, wherein the torso portion has a neck collar being coextensive with the neck opening, wherein the slit extends through and downwardly from the neck collar, wherein the fastener is attached to the coverall body on each of a pair of opposing edges of the coverall body adjacent to the slit.

11. The method of claim 9, further comprising a step of adhering a face rim of the hood body to the head section of the deceased infant, the face rim being coextensive with the face opening.

12. The method of claim 9, wherein the step of dressing the deceased infant in clothes further comprises positioning a bonnet over the hood body.

* * * * *